United States Patent
Kawaguchi

(10) Patent No.: US 8,468,307 B2
(45) Date of Patent: Jun. 18, 2013

(54) INFORMATION PROCESSING APPARATUS AND ORDER GUARANTEE METHOD

(75) Inventor: Eiichiro Kawaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 421 days.

(21) Appl. No.: 12/536,081

(22) Filed: Aug. 5, 2009

(65) Prior Publication Data

US 2010/0042771 A1 Feb. 18, 2010

(30) Foreign Application Priority Data

Aug. 13, 2008 (JP) ................................ 2008-208322

(51) Int. Cl.
*G06F 12/00* (2006.01)

(52) U.S. Cl.
USPC .................................. 711/144; 711/E12.069

(58) Field of Classification Search
USPC ......................................................... 711/144
See application file for complete search history.

(56) References Cited

U.S. PATENT DOCUMENTS

2003/0070048 A1* 4/2003 Spangler et al. .............. 711/146
2007/0186054 A1* 8/2007 Kruckemyer et al. ........ 711/144

FOREIGN PATENT DOCUMENTS

| JP | 62-288949 A | 12/1987 |
|---|---|---|
| JP | 10-198644 A | 7/1998 |
| JP | 11-96124 A | 4/1999 |
| JP | 2002007371 A | 6/2000 |
| JP | 2000194680 A | 7/2000 |

OTHER PUBLICATIONS

Japanese Office Action for JP2008-208322 mailed Aug. 31, 2010.
S. Urushibara, "DASH: A Scalable Shared-Memory Multiprocessor", Journal of Information Processing Society of Japan, Information Processing Society of Japan, vol. 33, No. 2, Feb. 1992, pp. 143-152.

* cited by examiner

*Primary Examiner* — Reginald Bragdon
*Assistant Examiner* — Hamdy S Ahmed

(57) ABSTRACT

A scheme is provided that guarantees the completion of cache invalidation processing in an information processing apparatus that performs directory-based coherence control. Each processor includes a cache and a Fence control unit that transmits an identifier to be returned to its own processor toward each bank through a network at timing when guarantee of completion of consistency processing of data stored in shared memory and the cache is requested and confirms that the identifier is returned from each bank. Each bank includes a memory main body, a directory that issues an invalidation request for invalidating the data stored in the cache according to an area where the data is written to the memory main body, and an invalidation request queue that queues the invalidation request and the identifier and transmits one of the invalidation request and the identifier through the network in a sequence of queuing.

10 Claims, 7 Drawing Sheets

INFORMATION PROCESSING APPARATUS AND ORDER GUARANTEE METHOD

INCORPORATION BY REFERENCE

This application is based upon and claims the benefit of priority from Japanese patent application No. 2008-208322, filed on Aug. 13, 2008, the disclosure of which is incorporated herein in its entirety by reference.

BACKGROUND OF THE INVENTION

1. Technical Field

The present invention relates to an information processing apparatus that includes shared memory and a plurality of processors having a cache and performs directory-based coherence control and an order guarantee method which guarantee the consistency of data stored in the shared memory and the cache, and, particularly, to an information processing apparatus and an order guarantee method in which the shared memory is composed of a plurality of banks and which employs the release consistency model.

2. Background Art

In a system where a plurality of processors having a cache share memory (shared memory), when data is written to the shared memory, coherence control is necessary that invalidates data stored in the cache in each processor and thereby guarantees the consistency of data stored in the shared memory and the cache. In order to implement the coherence control, an invalidation request for invalidating (clearing) data stored in the cache is issued when a store instruction is issued by the processor. Further, in order to guarantee the completion of processing of the invalidation request, a Release instruction and a Fence instruction are used, for example.

Specifically, assuming the use of a Release processor that writes data to the shared memory and an Acquire processor that is requested to invalidate the cache data, the following control is required. The Release processor issues a Release instruction for synchronization with the Acquire processor. The Acquire processor detects the Release instruction and thereby establishes synchronization with the Release processor. The synchronism between the Release processor and the Acquire processor is the state where a result that the Release processor has accessed the shared memory is reflected on the shared memory and an invalidation request of the cache in the Acquire processor is issued in response to writing (store instruction) to the shared memory, before the issue of the Release instruction. In this stage, however, the completion of processing of the issued invalidation request is not guaranteed.

For example, Japanese Unexamined Patent Application Publication No. 2002-7371 discloses a technique of implementing the coherence control in a multiprocessor-type information processing apparatus in which a plurality of processors and a plurality of main storages are connected by a switch-type main storage control unit.

Further, in the release consistency model, the order of cache invalidation processing is not particularly fixed during a period of normal processing, which is a period until timing to guarantee the consistency of data stored in the shared memory and the cache is specified. Because the timing when the invalidation request is issued from each bank is different in the shared memory that is composed of a plurality of banks, it has been difficult to guarantee the completion of processing of the invalidation requests in each processor. Japanese Unexamined Patent Application Publication No. 2002-7371 discloses nothing about such a technique.

However, in an information processing apparatus (computer system) that shares memory composed of a plurality of banks among a plurality of processors and performs the directory-based coherence control, it is necessary to detect the timing when the consistency of data stored in the shared memory and the cache is guaranteed. Particularly, in order for the information processing apparatus to conform to the release consistency model, it is necessary to have a mechanism for guaranteeing the completion of processing of the invalidation request of the cache in each processor when the timing to guarantee the completion of processing of the invalidation request that enables the consistency of data stored in the shared memory and the cache.

SUMMARY

In light of the foregoing, an exemplary object of the present invention is to provide a scheme for guaranteeing the completion of cache invalidation processing in an information processing apparatus that performs directory-based coherence control of shared memory composed of a plurality of banks.

An information processing apparatus according to an exemplary aspect of the invention includes shared memory including a plurality of banks, a plurality of processors, and a network that connects the plurality of processors and the shared memory, wherein each processor includes a cache that stores a copy of a part of data stored in the shared memory, and a Fence control unit that transmits an identifier to each bank through the network at timing when guarantee of completion of consistency processing of data stored in the shared memory and the cache is requested and confirms that the identifier is returned from each bank, and each bank includes a memory main body, a directory unit that stores area information of the memory main body for data stored in the cache and issues an invalidation request for invalidating the data stored in the cache according to an area where the data is written to the memory main body, and a queuing unit that queues the invalidation request and the identifier and transmits one of the invalidation request and the identifier through the network in a sequence of queuing.

An order guarantee method for an information processing apparatus including shared memory having a plurality of banks, a plurality of processors having a cache, and a network connecting the plurality of processors and the shared memory, to perform directory-based coherence control between the shared memory and the cache according to another exemplary aspect of the invention includes transmitting an identifier from each processor to each bank at timing when guarantee of completion of consistency processing between the shared memory and the cache is requested, queuing an invalidation request for invalidating the cache and the identifier in each bank in a sequence of reception, transmitting the invalidation request and the identifier from each bank to at least one of the plurality of processors in a sequence of queuing, and confirming return of the identifier in each processor.

BRIEF DESCRIPTION OF THE DRAWINGS

The above and other aspects, features, and advantages of the present invention will become more apparent from the following description of certain exemplary embodiments when taken in conjunction with the accompanying drawings, in which.

EXEMPLARY EMBODIMENT

Figure 2:
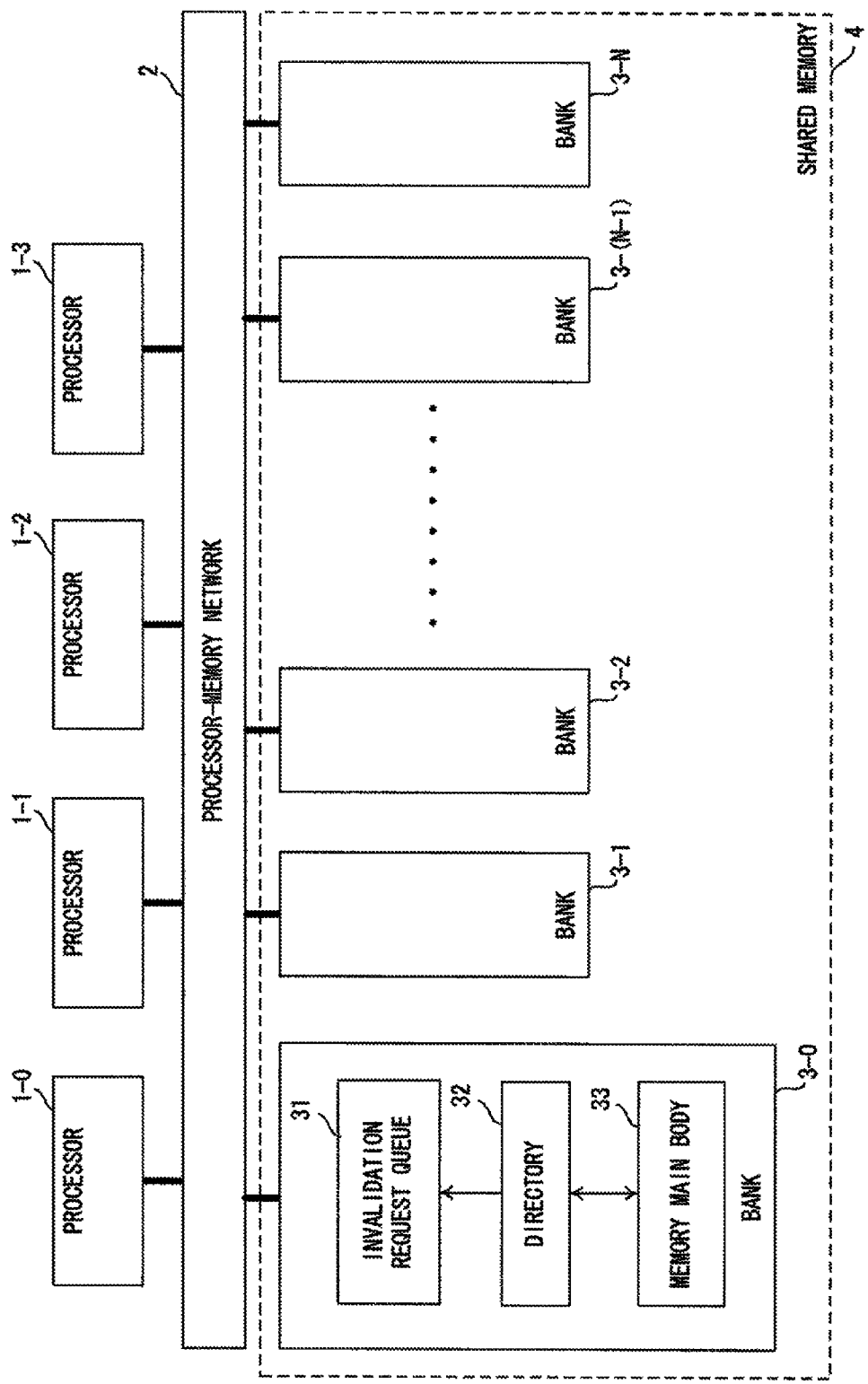
FIG. 2 is a block diagram showing an exemplary configuration of an information processing apparatus according to a first exemplary embodiment of the present invention.

An exemplary embodiment of the present invention will be described hereinafter with reference to the drawings. The following description and the attached drawings are appropriately shortened and simplified to clarify the explanation. In the drawings, the structural elements and equivalents having an identical structure or function are denoted by the identical reference symbols, and the redundant explanation thereof is omitted. Further, in the following description, a plurality of identical structural elements are distinguished, where necessary, by adding "-n" (n is an integer satisfying n≧0) to the reference symbol. For example, FIG. 2 shows a plurality of processors 1-0, 1-1, . . . , and 1-j (=3 in FIG. 2). In the description with reference to FIG. 2, a processor 1 indicates any one or a plurality of the plurality of processors 1-0 to 1-j, and a processor 1-0 (or a processor 1-1 or the like) indicates each of the plurality of processors in distinction from one another.

Figure 1:
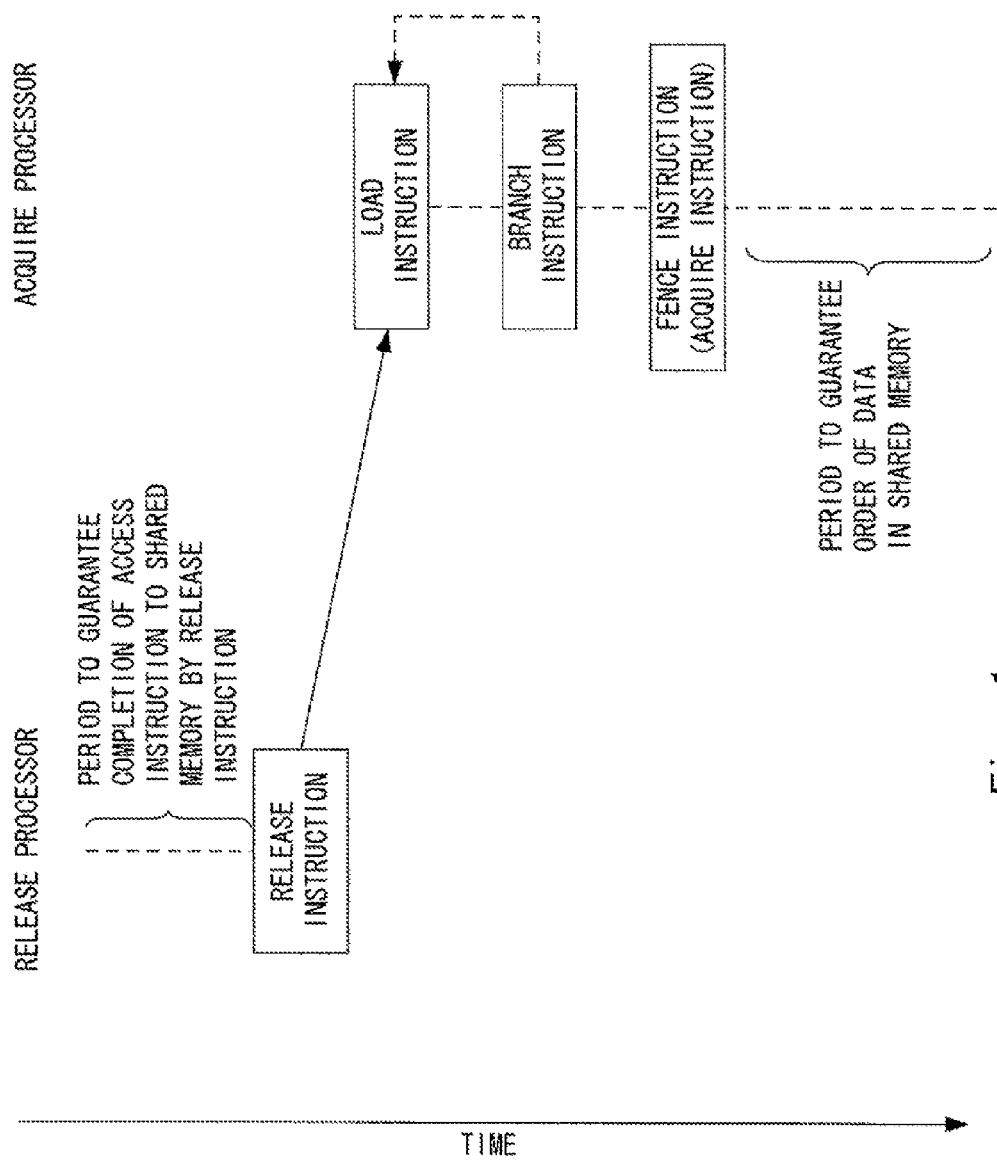
FIG. 1 is a view to describe a procedure of establishing synchronization in the release consistency model.

The release consistency model, the use of which is assumed, is described firstly. FIG. 1 shows a memory order guarantee procedure in the release consistency model. The memory order guarantee is to guarantee the global visibility of data. Stated differently, the memory order guarantee is to guarantee the completion of processing that is necessary for enabling the consistency of data stored in the shared memory and the cache. Specifically, in order to enable the consistency of data stored in the shared memory and the cache, an invalidation request that requests invalidation of data in the cache is issued in response to a store instruction that instructs writing of data to the shared memory. Then, by detecting die timing to complete processing of the issued invalidation request, the global visibility is guaranteed. In the release consistency model, the order of processing the cache invalidation requests is not particularly fixed. Thus, a state where processing of the invalidation requests that have been issued up to given timing is completed may be referred to as "memory order guarantee" or "data order guarantee". In the example of FIG. 1, the memory order guarantee is implemented with use of a Release instruction and a Fence instruction. The Fence instruction is also referred sometimes to as an Acquire instruction.

In FIG. 1, an information processing apparatus that includes shared memory and a plurality of processors is assumed. The plurality of processors each have a cache that stores a copy of a part of data that is stored in the shared memory. One of the plurality of processors is a Release processor, and another one is an Acquire processor. FIG. 1 shows a procedure in which the Release processor issues a Release instruction and thereby synchronizes with the Acquire processor. The Release instruction is an instruction that instructs timing to establish synchronization between the Release processor and the Acquire processor. In other words, the Release instruction is an instruction that requests the guarantee of completion of invalidation processing. The invalidation processing is to achieve the consistency between data stored in the shared memory and data stored in the cache of the processor. Thus, for the Acquire processor, the timing when the Release instruction is detected corresponds to the timing when the guarantee of processing completion of the consistency of data is requested.

In the release consistency model, a visualization order of memory access instructions before the issue of the Release instruction is not guaranteed. Thus, the timing when the invalidation request that is issued in response to a memory access instruction, e.g. a store instruction (write instruction), is processed is indeterminate because the invalidation request is processed independently of one another in each bank. Thus, the timing that allows reference to a result that another processor has executed a memory access instruction is not guaranteed.

The issue of the Release instruction for synchronization 2 triggers processing for guaranteeing the completion of the access instruction to the shared memory prior to the Release instruction. Specifically, the Release processor issues the Release instruction upon completion of the access instruction (particularly, the store instruction) to the shared memory. The Acquire processor detects the Release instruction and then issues the Fence instruction, thereby executing a procedure to guarantee the completion of processing of the invalidation request.

Referring to FIG. 1, at the stage where the Release instruction is issued, the completion of the access instruction to the shared memory that is issued by the Release processor is guaranteed. Specifically, the Release processor issues the store instruction to be executed before the Release instruction is issued and then issues the Release instruction. Further, the Acquire processor detects the Release instruction and then issues the Fence instruction and performs processing for guaranteeing the order of data in tie shared memory.

FIG. 1 shows a case where the Release instruction is implemented by the store instruction for writing store data to a given area of the shared memory. It is assumed that the store data is predetermined between the Release processor and the Acquire processor.

The Release processor issues the above-described store instruction as the Release instruction. The Acquire processor waits for the store data by the Release instruction by executing a load instruction and a branch instruction (wait state) and proceeds to the next processing after the wait is completed.

If writing of the store data is detected by the branch instruction, the Acquire processor issues a Fence instruction (Acquire instruction). After the Fence instruction is issued, it is necessary to guarantee the order of data in the shared memory. Stated differently, it is necessary to guarantee the consistency between the shared memory and the cache memory. Therefore, during a period after the Fence instruction is issued (in a strict sense, a period after the completion of processing of the Fence instruction), it is necessary to complete tie processing of the invalidation requests that have been requested before the Release instruction is issued and thereby guarantee the order of the data in the shared memory.

In order to guarantee the order of the data in the shared memory, the Fence instruction needs to ensure the following two conditions.

(1) Prevent the speculative execution of die load instruction subsequent to the Fence instruction. Specifically, it is necessary to inhibit access to the shared memory before the wait is completed. Such a function is generally implemented in the processor by disabling the load instruction from getting ahead of the Fence instruction.

(2) Guarantee the completion of the invalidation request to the Acquire processor in response to the store instruction prior to the Release instruction. Although it is necessary to guarantee the completion of the invalidation request, the sequence of processing of the invalidation requests of the cache is indeterminate. FIG. 1 does not show a scheme for keeping track of the completion of processing of the invalidation request. Specifically, if an architecture is assumed in which a plurality of processors share memory having a plurality of banks and which performs the coherence control between the caches in the processors, the order of completion of the invalidation requests to the cache that are issued by the shared memory composed of the banks is not guaranteed.

However, as described earlier, it is necessary in the release consistency model to guarantee the order of the completion of the invalidation requests upon completion of the Fence instruction, which is synchronization processing. It is thus necessary to totally complete processing of the invalidation requests of the cache that have been requested before the issue of the Release instruction.

Therefore, a certain mechanism is required that guarantees the completion of the invalidation request in response to the store instruction prior to the Release instruction at the end of the Fence instruction. Thus, a scheme for guaranteeing the completion of the invalidation request of the cache is described in an exemplary embodiment below.

[First Exemplary Embodiment]

In a first exemplary embodiment of the present invention, a scheme is added that enables keeping track of the completion of processing of the invalidation request at the time of issuing the Fence instruction. Specifically, the following processing is performed. First, when issuing the Fence instruction, an identifier (Fence instruction ID) of the instruction is broadcasted to all the banks in the shared memory. The identifier is an instruction to be returned to an issuer. Consequently, every broadcasted identifier is queued in an invalidation request queue in each bank. After that, each identifier is returned to the issuer processor, thereby guaranteeing the completion of the invalidation request before the issue of the Fence instruction. This is described in further detail hereinafter with reference to the drawings.

FIG. 2 is a block diagram showing an example of a configuration of an information processing apparatus according to the first exemplary embodiment of the present invention. The information processing apparatus includes a processor 1, a processor-memory network (network) 2 and shared memory 4. The shared memory 4 is made up of a plurality of banks 3. Although four processors 1-0 to 1-3 and N+1 (N≧0) number of banks 3-0 to 3-N are shown in FIG. 2, they are shown by way of illustration only, and the number of processors and the number of banks are not limited thereto.

Figure 3:
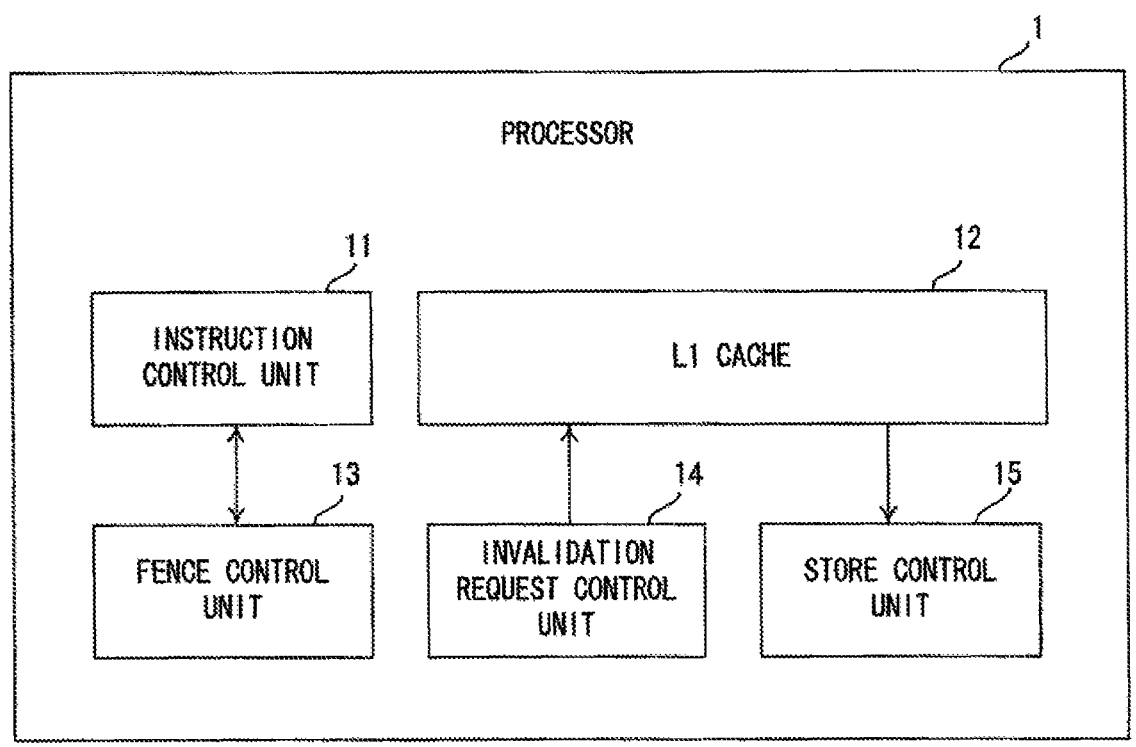
FIG. 3 is a block diagram showing an exemplary configuration of a processor.

The processor 1 accesses the shared memory 4 through the processor-memory network 2. FIG. 3 shows an example of an internal configuration of the processor 1. The processor 1 includes an instruction control unit (instruction control means) 11, an L1 cache (cache) 12, a Fence control unit (Fence control means) 13, an invalidation request control unit 14, and a store control unit 15.

The instruction control unit 11 performs control of instructions. For example, the instruction control unit 11 controls execution of instructions for accessing the shared memory 4 such as a store instruction and a load instruction, and other instructions.

The L1 cache 12 is a primary cache that is generally placed in each processor or in each processor core. The L1 cache 12 temporarily stores a copy of data that is stored in the bank 3. In this description, a unit (area) to store a copy of data is referred to as a cache line. Further, in the L1 cache 12, a selected cache line is invalidated (cleared to a state of not storing data) by the invalidation request that is made from another processor.

The Fence control unit 13 performs control of the Fence instruction. Specifically, the Fence control unit 13 has a function of broadcasting the Fence instruction ID (identifier) to all the banks in the shared memory 4 upon synchronization with the Release processor, a function of confirming that all the broadcasted Fence instruction IDs are returned and a function of transferring a signal that permits execution of a subsequent instruction to the instruction control unit 11 based on the confirmation.

The invalidation request control unit 14 has a function of invalidating the L1 cache 12 upon receiving the invalidation request. The invalidation request is issued from the bank 3 in the shared memory 4 if its own processor stores the same cache line when the store instruction is issued from another processor. The invalidation request requests the invalidation of the relevant cache line.

The store control unit 15 controls store-related instructions (the store instruction or an instruction for rewriting data in the shared memory). The store control unit 15 also has a function of guaranteeing that an instruction prior to the Release instruction has been issued at the time of issuing the Release instruction.

The processor-memory network 2 is a mechanism for connecting the processor 1 and the shared memory 4. The processor 1 and the shared memory 4 may be connected in any form in this exemplary embodiment.

The shared memory 4 is a storage area to be used by the plurality of processors 1. The shared memory composed of banks is illustrated as an example. Although FIG. 2 shows the shared memory, a shared cache may be used instead. The shared memory 4 includes an on-chip cache that is shared among recent multi-core processors. The plurality of banks 3 are bank-type memory that form the shared memory 4. The internal structure of the bank 3-0 is shown as a representative example in FIG. 2. The other banks 3-1 to 3-N also have the same structure, although not shown. The bank 3 includes an invalidation request queue (queuing unit) 31, a directory (directory unit) 32 and a memory main body 33.

The directory 32 has a function of unifying the management of the consistency between the L1 cache 12 and the shared memory 4. Further, the directory 32 stores information (area information) about the cache lines that are stored in the L1 cache 12 in each processor 1. The directory 32 also has a function of instructing the invalidation request queue 31 to issue the invalidation request to the processor 1 where the invalidation is necessary when it determines that the invalidation of the L1 cache 12 is necessary based on the stored information of the cache line. The invalidation request contains information of the processor 1 to be invalidated.

Figure 4:
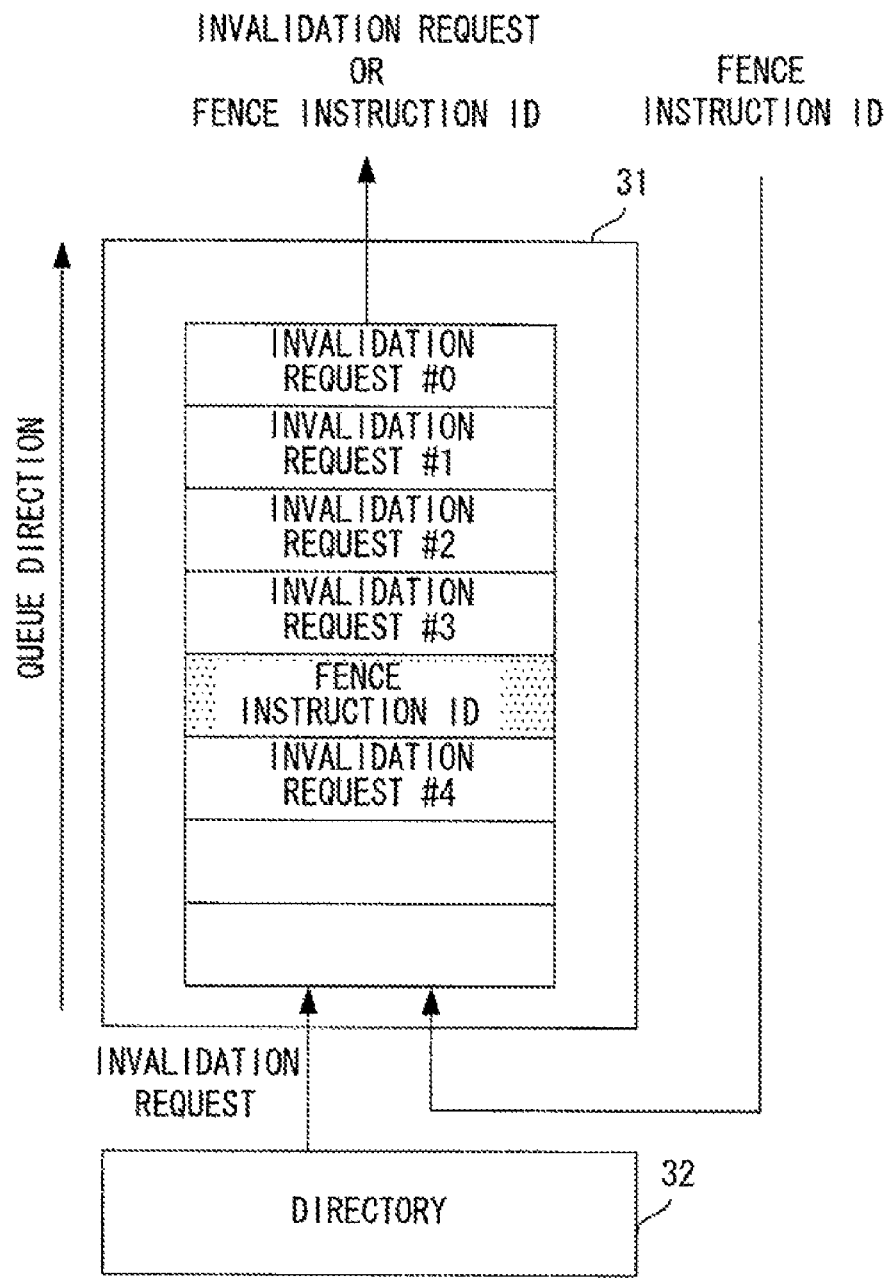
FIG. 4 is a view showing an exemplary structure of an invalidation request queue.

The invalidation request queue 31 has a function of issuing the invalidation request that is issued by the directory 32 to the processor 1 to be invalidated. FIG. 4 shows an example of a structure of the invalidation request queue 31. The invalidation request queue 31 has a First-In First-Out queue structure. FIG. 4 shows an example in which the invalidation request or the like enters from below (from the bottom), so that entries become older toward the head. The invalidation request is issued to the processor 1 from the entry at the head (the oldest entry). Further, the invalidation request queue 31 has an input port of the Fence instruction ID in addition to an input port of the invalidation request that enters from the directory 32. The Fence instruction ID is an identifier that is broadcasted from the Fence control unit 13 of the processor 1, and the Fence instruction ID is also queued in the same manner as the invalidation request, and it is issued to the issuer processor 1 when it reaches the head of the queue.

The memory main body 33 is general memory in a computer system.

Figure 5:
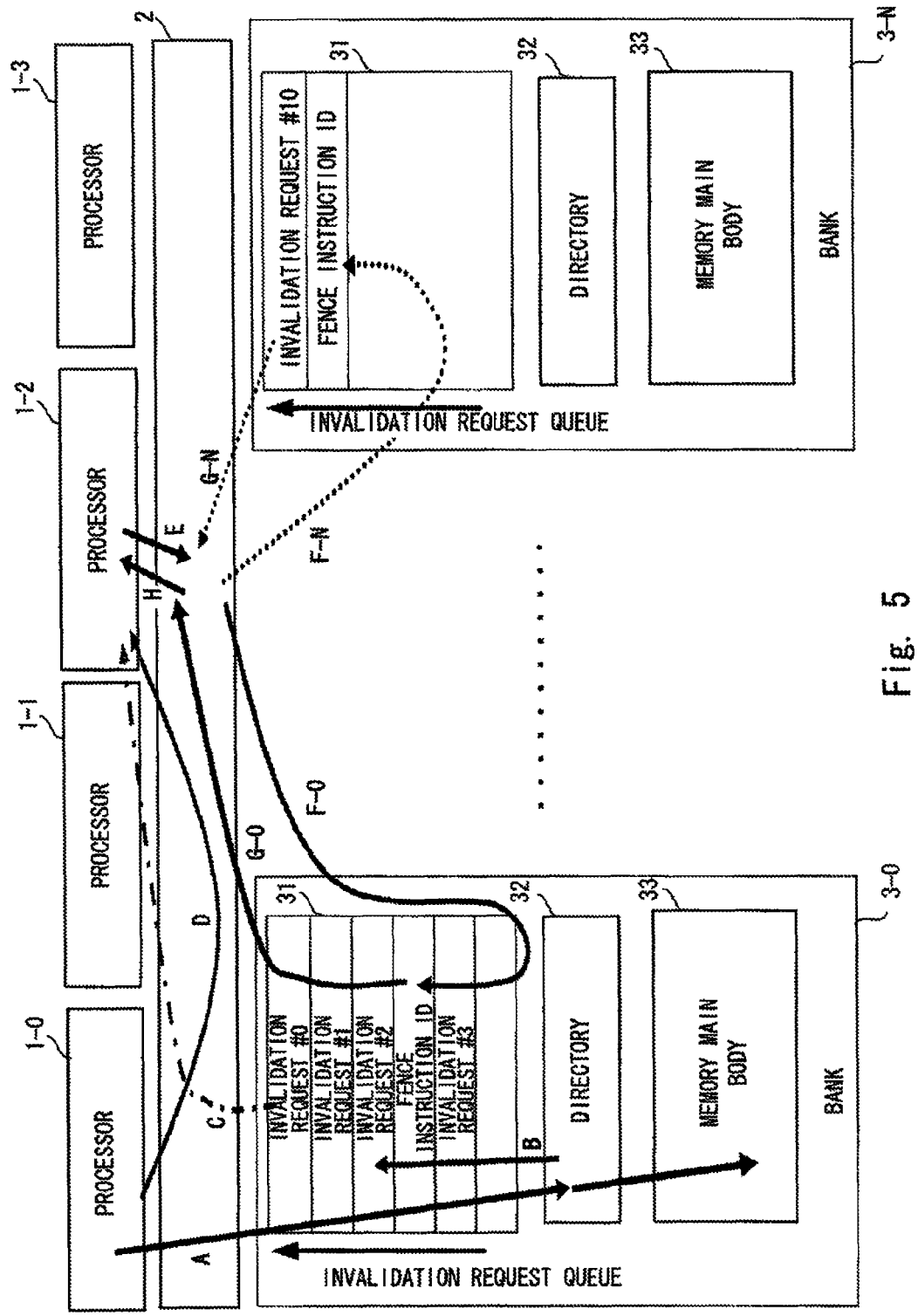
FIG. 5 is a view showing an outline of processing of an invalidation request.

An outline of an operation that the invalidation request is stored into the invalidation request queue 31 and processed is described hereinafter in chronological order. Referring to FIG. 5, it is assumed that the processor 1-0 is the Release processor, and the processor 1-2 is the Acquire processor. The bank 3-0 and the bank 3-N are shown among the plurality of banks 3 forming the shared memory 4. If the Release processor issues the store instruction, the directory 32 of the bank 3 determines whether the invalidation processing is necessary. Specifically, if the cache line shared by the Acquire processor and the cache line to be written according to the store instruction match, the directory 32 issues the invalidation request for invalidating the corresponding cache line in the L1 cache 12 included in the Acquire processor. The symbols A to H in FIG. 5 indicate lines representing the flow of the processing (instruction). The operation is described hereinafter specifically with use of Lines A to H in FIG. 5.

First, the Release processor issues the store instruction to the cache line that is shared by the Acquire processor (Line A). The store instruction is input to the directory 32 and writes data to the memory main body 33. When the store instruction writes data to the shared memory 4, the directory 32 examines the information of the cache line and detects the processor that is necessary to be invalidated. It is assumed that the L1 cache 12 of the Acquire processor (processor 1-2) corresponds thereto, for example. The directory 32 queues the invalidation request (e.g. the invalidation request #2) for the Acquire processor in the invalidation request queue 31 included in its own bank 3 (Line B).

The queued invalidation request is issued to the processor 1 that is specified by the invalidation request when it reaches the head of the queue (Line C). An order of completing the invalidation requests that are issued from the invalidation request queues 31 of the respective banks 3 is not guaranteed. Thus, the order of executing the invalidation requests can change because of a reasons such as that each bank 3 issues the invalidation request independently, that the degree of crowdedness of the invalidation request queue 31 of each bank 3 varies, or that the congestion of a path from each bank 3 to the Acquire processor varies. Specifically, in FIG. 5, for example, the invalidation request #2 is queued in response to the store instruction to the bank 3-0, and then the invalidation request #10 is queued in response to the store instruction to the bank 3-N. However, an order (timing) of completing the processing of the invalidation request #2 and the invalidation request #10 is unknown.

The Release processor establishes synchronization with the Acquire processor by issuing the Release instruction (Line D). In other words, the Release processor issues the Release instruction when it synchronizes with the Acquire processor.

On the other hand, the Acquire processor receives the Release instruction and thereby issues the Fence instruction (Line E). In this example, the processor 1-2 issues the Fence instruction. At the start of the execution of the Fence instruction, an identifier of the instruction is broadcasted to all the banks 3. The broadcasted identifier is queued in the respective invalidation request queues 31 that have been used in the previous invalidation request (Line F-0 to F-N). Although FIG. 5 shows the bank 3-0 and the bank 3-N, the Fence instruction ID is queued in the same manner in the other banks.

If the invalidation requests are sequentially issued from the respective invalidation request queues 31 in all the banks 3, the identifier is issued at some point. The identifier (Fence instruction ID) to be issued is returned to the issuer processor (Line G-0 to G-N). If the Acquire processor receives all the broadcasted identifiers, it is guaranteed that all the invalidation requests before synchronization are completed (Line H). Thus, the Acquire processor can proceed to the subsequent processing at the time when reception of all identifiers is completed.

Referring then to the flowcharts of FIGS. 6 and 7, processing that the Release processor writes shared data to the shared memory 4 (shared data writing processing on the Release side) and synchronization processing executed by the Acquire processor in response to reception of the Release instruction (synchronization processing on the Acquire side) are described hereinafter specifically.

Figure 6:
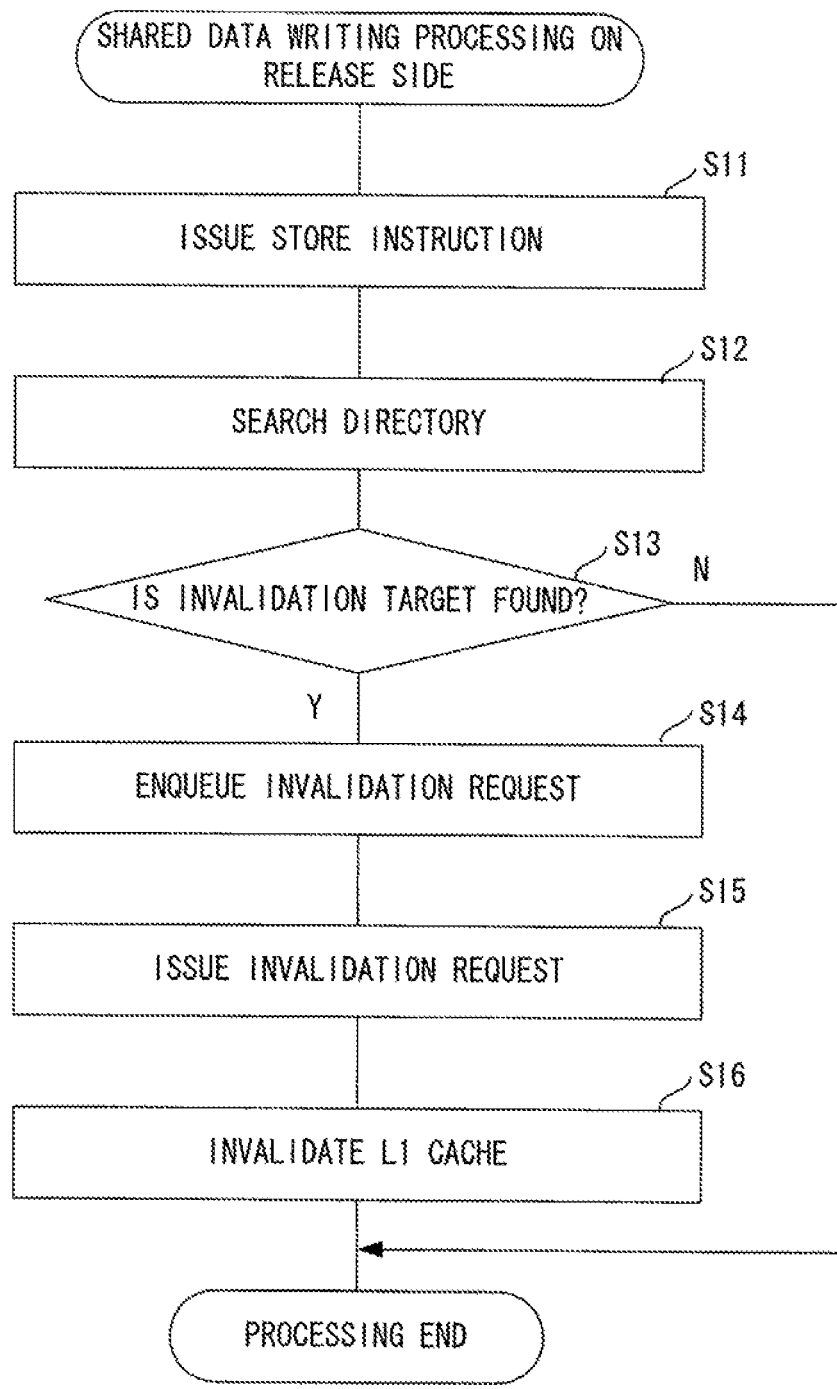
FIG. 6 is a flowchart showing an exemplary operation of processing that a Release processor writes data to shared memory.
Figure 7:
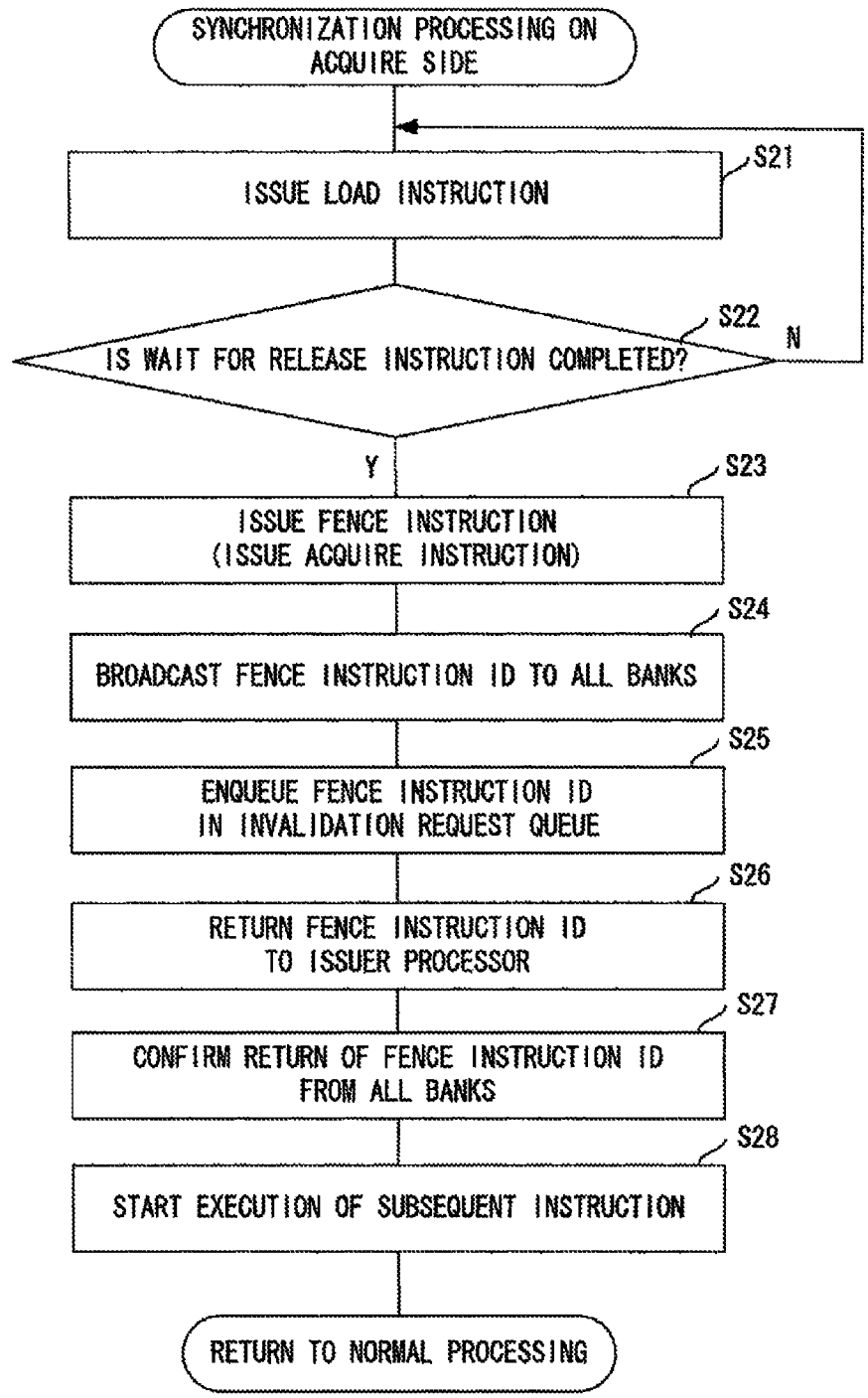
FIG. 7 is a flowchart showing an exemplary operation of synchronization processing in an Acquire processor.

FIG. 6 is a flowchart showing an example of an operation of processing that the Release processor writes data to the shared memory. FIG. 7 is a flowchart showing an example of an operation of synchronization processing in the Acquire processor. The shared data writing processing on the Release side shown in FIG. 6 is triggered by an operation of the Release processor. The synchronization processing on the Acquire side shown in FIG. 7 is triggered by an operation of the Acquire processor.

First, the shared data writing processing on the Release side is described hereinafter with reference to FIGS. 2, 3 and 6. It is assumed firstly that the Release processor issues the store instruction to memory space that is shared with the Acquire processor (S1). The store instruction is transmitted from the store control unit 15 in the processor 1 to any of the banks 3-0, 3-1, . . . , 3-N constituting the shared memory 4 through the processor-memory network 2.

The directory 32 in the bank 3 examines the coherence of the received store instruction (S12) and determines whether invalidation is necessary to maintain the consistency of the memory (S13). If it is not necessary to make the invalidation request (N in S13), the directory 32 ends the processing, and if it is necessary to make the invalidation request (Y in S13), the directory 32 enqueues the invalidation request in the invalidation request queue 31 (S14). If the invalidation request reaches the head of the invalidation request queue 31, which is a queue structure, the invalidation request is issued to the target processor (S15). The invalidation request control unit 14 in the processor 1 which has received the invalidation request invalidates the L1 cache 12 according to the request.

It is, however, not guaranteed in this state when the invalidation request ends. Thus, the timing when the invalidation request is issued from the invalidation request queue 31 is not guaranteed. The guarantee of the completion of the invalidation request is implemented by the Acquire processor, which is described later. The above is the flow of the invalidation operation in response to the store instruction performed in the Release processor.

Next, an operation of the synchronization processing on the Acquire side is described hereinafter with reference to FIGS. 2, 3 and 7. A case where the Acquire processor waits for the Release instruction with use of the load instruction and the branch instruction and thereby performs synchronization is described (S21, S22). This is thus a form of polling for writing by the Release instruction. The present invention, however, is not limited to such a procedure, and a state of waiting for the Release instruction may be formed by another procedure.

In this example, the Acquire processor detects that an arbitrary value is written to a given area of an arbitrary bank 3 in the shared memory 4 by the Release instruction that is issued by the Release processor. Specifically, the instruction control unit 11 in the Acquire processor executes the load instruction and reads the given area (S21), and repeats the execution of the load instruction until the read value detects the arbitrary value (N in S22). If the arbitrary value is detected, the wait for the Release instruction is completed (Y in S22).

If the Acquire processor confirms the writing by the Release instruction (Y in S22), the Fence control unit 13 issues the Fence instruction. By the Fence instruction, the above-described conditions of (1) preventing the speculative execution of the load instruction subsequent to the Fence instruction and (2) guaranteeing the completion of the invalidation request to the Acquire processor in response to the store instruction prior to the Release instruction are ensured. Because a well-known common practice exists for the condition (1), the above condition (2) "guaranteeing the completion of the invalidation request", which is a principal objective of the present invention, is described hereinafter.

If the Fence instruction is issued, the Fence control unit 13 issues the Fence instruction ID, which is an identifier of the Fence instruction, to all the banks 3 in the shared memory 4 (S24). At this time, the Fence control unit 13 performs control that causes the instruction control unit 11 to suspend the execution of a subsequent instruction (suspension of execution of a subsequent instruction). Each bank 3 in the shared memory 4 which has received the Fence instruction ID enqueues the Fence instruction ID in the invalidation request queue 31 (S25). When the Fence instruction ID comes the head of the invalidation request queue 31, each bank 3 returns the Fence instruction ID to the issuer processor 1 (S26). Then, the Fence control unit 13 confirms that all the broadcasted Fence instruction IDs are returned (S27). By confirming that all of the broadcasted Fence instruction IDs are returned, it is possible to guarantee that all the invalidation requests that have been generated prior to the issue of the Fence instruction are completed.

After confirming the return of all the Fence instruction IDs, the Fence control unit 13 notifies the instruction control unit 11 of permission to execute a subsequent instruction. As a result, a normal subsequent instruction is executed in the state where the memory order guarantee including the invalidation request has been conducted (S28).

As described in the foregoing, according to the exemplary embodiment, it is possible to guarantee the global visibility of the invalidation request for the Acquire processor in the shared memory architecture which is composed of banks and in which the order of the invalidation requests is not guaranteed.

The present invention may be applied to a computer architecture that includes memory (or memory cache) composed of a plurality of banks which is shared by a plurality of processors and performs directory-based coherence control. It is thereby possible to guarantee the completion of invalidation processing of the cache in each processor. Particularly, by applying the present invention to such an architecture, it is possible to implement a system that guarantees the global visibility of the invalidation request to the Acquire processor that executes the memory order guarantee based on the release consistency model.

Further, the present invention may be used in any computer system composed of shared memory and a plurality of processors which performs coherence control among caches in the respective processors and employs the release consistency model for the memory order guarantee scheme.

According to the exemplary embodiment of the present invention, it is possible to provide a scheme for guaranteeing the completion of cache invalidation processing in an information processing apparatus that performs directory-based coherence control of shared memory composed of a plurality of banks.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An information processing apparatus comprising:
    shared memory including a plurality of banks;
    a plurality of processors; and
    a network that connects the plurality of processors and the shared memory, wherein each processor includes
        a cache that stores a copy of a part of data stored in the shared memory, and
        a Fence control unit that transmits an identifier to each bank through the network at timing when guarantee of completion of consistency processing of data stored in the shared memory and the cache is requested, and confirms that the identifier is returned from each bank, and
    each bank includes
        a memory main body,
        a directory unit that stores area information of the memory main body for data stored in the cache and issues an invalidation request for invalidating the data stored in the cache according to an area where the data is written to the memory main body, and
        a queuing unit that queues the invalidation request and the identifier and transmits one of the invalidation request and the identifier through the network in a sequence of queuing,
    the plurality of processors include a first processor and a second processor, and
    when the first processor requests the second processor to guarantee the completion of consistency processing of data, the Fence control unit of the second processor transmits the identifier to each bank, and the queuing unit of each bank queues the identifier at a position subsequent to the queued invalidation request and transmits the identifier after transmission of the invalidation request queued before queuing of the identifier.

2. The information processing apparatus according to claim 1, wherein completion of consistency processing of data is guaranteed based on a release consistency model.

3. The information processing apparatus according to claim 1, wherein the Fence control unit detects the timing by a Release instruction issued by another processor and, after detecting the Release instruction, broadcasts the identifier to all of the plurality of banks.

4. The information processing apparatus according to claim 3, wherein completion of consistency processing of data is guaranteed based on a release consistency model.

5. The information processing apparatus according to claim 3, wherein
    each processor further includes an instruction control unit that controls execution of an instruction, and the Fence control unit suspends execution of a subsequent instruction after transmitting the identifier to the plurality of banks until confirming that the identifier is returned from all banks.

6. The information processing apparatus according to claim 5, wherein completion of consistency processing of data is guaranteed based on a release consistency model.

7. An order guarantee method for an information processing apparatus including shared memory having a plurality of banks, a plurality of processors having a cache, and a network connecting the plurality of processors and the shared memory, to perform directory-based coherence control between the shared memory and the cache, the method comprising:

transmitting an identifier from each processor to each bank at timing when guarantee of completion of consistency processing between the shared memory and the cache is requested;

queuing an invalidation request for invalidating the cache and the identifier in each bank in a sequence of reception;

transmitting the invalidation request and the identifier from each bank to at least one of the plurality of processors in a sequence of queuing; and confirming return of the identifier in each processor, the plurality of processors include a first processor and a second processor, and when the first processor requests the second processor to guarantee the completion of consistency processing of data, a Fence control unit of the second processor transmits the identifier to each bank, and the queuing unit of each bank queues the identifier at a position subsequent to the queued invalidation request and transmits the identifier after transmission of the invalidation request queued before queuing of the identifier.

8. The order guarantee method according to claim 7, wherein each processor executes a subsequent instruction at timing when the identifier is returned from all banks.

9. The order guarantee method according to claim 7, wherein completion of consistency processing of data is guaranteed based on a release consistency model.

10. An information processing apparatus comprising:
shared memory including a plurality of banks;
a plurality of processors; and
a network that connects the plurality of processors and the shared memory, wherein each processor includes
a cache that stores a copy of a part of data stored in the shared memory, and
a Fence control means that transmits an identifier to each bank through the network at timing when guarantee of completion of consistency processing of data stored in the shared memory and the cache is requested, and confirms that the identifier is returned from each bank, and
each bank includes
a memory main body,
a directory means that stores area information of the memory main body for data stored in the cache and issues an invalidation request for invalidating the data stored in the cache according to an area where the data is written to the memory main body, and
a queuing means that queues the invalidation request and the identifier and transmits one of the invalidation request and the identifier through the network in a sequence of queuing,
the plurality of processors include a first processor and a second processor, and
when the first processor requests the second processor to guarantee the completion of consistency processing of data, the Fence control unit of the second processor transmits the identifier to each bank, and the queuing unit of each bank queues the identifier at a position subsequent to the queued invalidation request and transmits the identifier after transmission of the invalidation request queued before queuing of the identifier.

* * * * *